United States Patent [19]

Tobias et al.

[11] 4,086,373

[45] Apr. 25, 1978

[54] PROTECTIVE POLYMERIC COATING FOR GLASS SUBSTRATE

[75] Inventors: John W. Tobias, Perrysburg; Lynn J. Taylor, Toledo, both of Ohio

[73] Assignee: Owens-Illinois, Inc., Toledo, Ohio

[21] Appl. No.: 564,254

[22] Filed: Apr. 2, 1975

[51] Int. Cl.² ............................................. B05D 3/06
[52] U.S. Cl. ...................................... 427/44; 427/45; 427/53; 427/54
[58] Field of Search ............... 215/12 R, DIG. 6; 428/35; 427/44, 54, 53, 12, 45

[56] References Cited

U.S. PATENT DOCUMENTS

| | | | |
|---|---|---|---|
| 3,441,424 | 4/1969 | Bolgiano | 215/DIG. 6 |
| 3,655,483 | 4/1972 | Borrel et al. | 427/54 |
| 3,772,061 | 11/1973 | McCoy et al. | 428/35 |
| 3,825,142 | 7/1974 | Compagna | 215/12 R |
| 3,836,386 | 9/1974 | Roy | 215/DIG. 6 |
| 3,857,769 | 12/1974 | McGinniss | 427/54 |
| 3,859,117 | 1/1975 | Erchak | 215/12 R |
| 3,898,349 | 5/1915 | Kehr et al. | 427/54 |

OTHER PUBLICATIONS

Encyclopedia of Polymer Science & Technology, vol. 10, pp. 154–155, 1969, John Wiley, N.Y.

Primary Examiner—James R. Hoffman
Attorney, Agent, or Firm—Donald Keith Wedding

[57] ABSTRACT

In accordance with this invention, a chemically convertible polymeric coating composition is applied to the surface of a glass substrate and subsequently converted to a crosslinked coating by the application of UV light or another form of energy. The polymeric coating composition contains at least two basic components:
(1) a rubbery thermoplastic organic polymer; and
(2) an organic photosensitizer.

10 Claims, No Drawings

PROTECTIVE POLYMERIC COATING FOR GLASS SUBSTRATE

BACKGROUND OF THE INVENTION

It is well-known that glass in its pristine condition is a very strong material, but that scratches and abrasion on the glass surface will considerably decrease its strength. Consequently, glass articles, for example, containers such as jars, bottles, tumblers, and the like, have maximum strength immediately after formation; however, this strength diminishes when the glass article surface contacts other surfaces as may occur during the inspection, handling, packaging, shipping, and consumer use of the article.

To overcome this problem, there has been a great deal of research in the glass industry towards development of thin, tenaciously adhering, lubricious, damage-preventive coatings which preserve the glass strength and allow the glass article to be handled and used by the consumer.

In the glass container industry, such damage-preventive coatings have been primarily of two types. In one type, the container is coated with a thin organic coating at the "cold end" of the annealing lehr where the temperature is in the range of 200°–400° F. These coatings have been water soluble polyoxyethylene stearate as in U.S. Pat. No. 2,813,045 (Abbott); polyethylene as in U.S. Pat. No. 2,995,533 (Parmer and Schaefer), and U.S. Pat. No. 2,965,596 (Scharf); or other organic materials as in U.S. Pat. Nos. 3,445,275 (Bogart); 3,487,035 (Bogart); 3,357,853 (Pickard); and 3,296,174 (Pickard).

In the second type of coating, the glass container is first coated with metal oxides such as the oxides of tin, titanium, vanadium, or zirconium at the hot end of the annealing lehr where the temperature is in the range of 1000° to 1100° F. and then overcoated with a protective organic coating at the cold end of the lehr. Such dual coatings are illustrated in U.S. Pat. Nos. 3,323,889 (Carl and Steigelman); 3,425,859 (Steigelman); 3,598,632 (Long); 3,554,787 (Plymale); 3,498,825 (Wiens); 3,418,154 (Rawski); 3,420,693 (Scholes and Pickard); 3,445,269 (Bruss et al.); 3,407,085 (Kitaj, et al.); 3,414,429 (Bruss, et al.); and 3,352,707 (Pickard). The above types of coatings are "production line" coatings because their application is accomplished as part of the forming and annealing sequence. The disclosures of these patents are incorporated herein by reference.

The success of some of these and other types of coatings, particularly those "cold end" coatings of polyethylene or polyoxyethylene stearate (with or without the "hot end" coating of $TiO_2$ or $SnO_2$) in preserving the strength of the glass containers during inspection, handling, filling, and use has permitted glass researchers to focus on the problems caused by mishandling and accidental misuse of glass containers by the consumer.

Glass containers are sometimes fractured by dropping or other accidental misuse. This problem is particularly acute when the glass container has pressurized contents such as in the case of beer or carbonated soft drinks.

In accordance with this invention, there is provided a coating for glass containers which is capable of retaining broken glass fragments upon fracture of the glass container so as to reduce the incidence of accidental injury.

Attention has been directed to this problem in the recent past. For instance, German patent disclosure, 2,026,909, published Dec. 10, 1970, discloses coating a glass container with a loosely or firmly adhering plastic material designed to form a "bag" which retains glass fragments when the container is broken. The film is formed by fusing powdered polyethylene to the glass bottle. German patent document 2,149,219, published May 25, 1972, discloses coating glass containers with a film coating of a hydrolyzed ethylene-vinyl acetate copolymer. U.S. Pat. No. 3,178,049 discloses a light, composite glass container having a wall thickness of about 0.15 to 0.70 millimeters surrounded on the outside by an envelope of a thermoplastic material having a wall thickness at least equal to the glass. U.S. Patent 3,415,673 discloses glass containers which are made resistant to breakage by coating the exterior surface with a thin, highly adhesive layer of plastic consisting essentially of ethylene and acrylic copolymers. A primer is used to tenaciously adhere the copolymer to the surface of the glass article.

Studies of the effect of organic coatings on the fragmentation of glass substrates have demonstrated that soft, flexible, "rubbery" polymeric coatings are extremely effective in retaining fragments. However, such coatings are not ordinarily suitable for use on glass containers, owing to their poor abrasion and mar resistance, low lubricity and surface tack, which preclude the handling of such coated containers on automatic filling lines. The present invention improves the physical properties and surface characteristics of such coating materials through chemical crosslinking.

DESCRIPTION OF THE INVENTION

Any suitable glass substrate is contemplated. However, in the typical practice of this invention, there is utilized a glass container. The foregoing description of embodiments and specific practices of this invention will generally be discusses in terms of a glass container substrate.

In accordance with this invention, there is prepared a coated glass substrate, having fragment-retentive properties.

More particularly, in accordance with the practice of this invention, a chemically convertible coating composition is applied to the surface of a glass substrate and subsequently converted to a protective polymer film by irradiation with ultraviolet light or other forms of energy. The chemically convertible coating composition contains at least two ingredients:

(1) a rubbery thermoplastic organic polymer; and
(2) an organic photosensitizer.

The term "rubbery thermoplastic organic polymer" may be defined as an elastomeric organic polymer having an ultimate elongation of at least 100%. At the time of the application to the glass substrate, the polymer is thermoplastic, i.e. it is not crosslinked, but it can subsequently be cross-linked by the combined action of the organic photosensitizer compound and light or another form of energy.

Typical examples of suitable rubbery thermoplastic organic polymers include ethylene-vinyl acetate copolymers, hydrolyzed ethylene-vinyl acetate copolymers, ethylene-ethyl acrylate copolymers, ethylene-acrylic acid copolymers and their salts, ethylene-propylene copolymers, styrene-butadiene copolymers including both block and random copolymers, a styrene-isoprene copolymers acrylonitrile-butadiene copolymers, isobutylene-isoprene copolymers, polyurethanes, thermoplastic polyesters, ethylene-propylene-diene terpolymers, styrene-ethylene-butylene block terpolymers, polypentenamers, and polyamides derived from "dimer acid".

As used herein the term "photosensitizer" is to be given a broad interpretation, and is intended to describe organic compounds and compositions which become photoreactive upon exposure to light in the ultraviolet spectrum.

The photosensitizers useful in this invention are those compounds and compositions known to promote photo-oxidation, photo-polymerization, and photocrosslinking reactions.

Typical of the photosensitizers are aliphatic and aromatic ketones, for example: acetophenone, acetoin, 1'-aceto-naphthone, 2'-acetonaphtone, anisoin, anthrone, bianthrone, benzil, benzoin, benzoin methyl ether, benzoin isopropyl ether, 1-decalone, 2-decalone, benzophenone, p-chlorobenzophenone, dibenzalacetone, benzoylacetone, benzylacetone, deoxybenzoin, 2,4-dimethylbenzophenone, 2,5-dimethylbenzophenone, 3,4-dimethyl-benzophenone, 4-benzoylbiphenyl, butyrophenone, 9-fluorenone, 4,4-bis-(dimethylamino)benzophenone, 4-dimethylaminobenzophenone, dibenzyl ketone, 4-methylbenzophenone, propiophenone, benzanthrone, 1-tetralone, 2-tetralone, valerophenone, 4-nitrobenzophenone, di-n-hexyl ketone, isophorone, and xanthone.

Aromatic ketones are preferred. Particularly preferred are benzophenone, benzoin, anthrone and deoxyanisoin.

Also useful as photosentiziers are quinones, for example: anthraquinone, 1-aminoanthraquinone, 2-aminoanthraquinone, 1-chloroanthraquinone, 2-chloroanthraquinone, 2-ethylanthraquinone, 1-methylanthraquinone, 2-methylanthraquinone, 1-nitroanthraquinone, 2-phenylanthraquinone, 1,2-napthhoquinone, 1,4-naphthoquinone, 2-methyl-1,4-naphthoquinone, 1,2-benzanthraquinone, 2,3-benzanthraquinone, phenanthrenequinone, 1-methoxyanthraquinone, 1,5-dichloroanthraquinone, and 2,2'-dimethyl-1, 1'-dianthraquinone, and anthraquinone dyes. Preferred quinones are 2-methylanthraquinone, 2-chloranthraquinone and 2-ethylanthraquinone.

Still other compounds which can be used as the photosensitizer are azo compounds. Typical of the useful compounds are: 2-azo-bis-isobutyronitrile, 2-azo-bis-propionitrile, dimethyl-2-azo-bis-isobutyrate, 1-azo-bis-1-cyclohexanecarbonitrile, 2-azo-bis-2-methylheptanitrile, 2-azo-bis-2-methylbutyronitrile, 4-azo-bis-4-cyanopentanoic acid, azodicarbonamide, azobenzene, and azo dyes.

Other photosensitizers will be apparent to those skilled in the art. Among these are: aromatic hydrocarbons such as, naphthalene, anthracene, phenanthrene, and 1-phenyldecane; aromatic nitro compounds such as, nitrobenzene, p-nitroanisole, 4-nitrobiphenyl, p-nitroaniline, and 2,4,6-trinitroaniline; aldehydes, for example, 2-ethylhexanal, tetradecyl aldehyde, phenylacetaldehyde, benzaldehyde, p-anisaldehyde, 4-benzyloxybenzaldehyde, 3,4-dibenzyloxybenzaldehyde, p-n-octyloxybenzaldehyde, 1-naphthaldehyde, 2-naphthaldehyde, and 9-anthraldehyde; organic sulfur compounds, for example, diphenyl disulfide, dibenzyl disulfide, dibenzoyl disulfide, dilauroyl disulfide, 1-naphthalenethiol, diisopropylbenzene thiol, 2-mercaptobenzothiazole, 2-mercaptobenzimidazole, tetramethylthiuram monosulfide, tetramethyl-thiuram disulfide, ethyl-2-benzothiazylsulfonate, and p-toluenesulfonyl chloride; organic halogen compounds such as, chlorinated paraffins, chlorinated biphenyls an polyphenyls, chlorinated toluenes, xylenes, etc., benzyl chloride, 3,4-dimethylbenzyl chloride, benzhydryl chloride, benzal chloride, benzotrichloride, chlorinated naphthalenes, 1-chloromethylnaphthalene, tetrachloro-tetrahydronaphthalene, phenacyl chloride, phenacyl bromide, and styrene dibromide; aryl amines such as, aniline, N, N-diethyl aniline, diphenylamine, triphenylamine, 1-naphthylamine, 2-naph-thylamine, p, p'-benzylidenebis (N, N-dimethylaniline), p,p',p''-triaminotriphenylmethane, p,p',p''-triaminotriphenyl carbinol, and 4,4'-diaminobiphenyl. Combinations of two or more photosensitizers may also be used.

Still other photosensitizers can be found in the following references: J. Kosar, "Light-Sensitive Systems", John Wiley & Sons, New York, 1965, Chapters 4 ("Unsaturated Compounds"), 5 ("Photopolymerization Processes") and 8 ("Photochemical Formation and Destruction of Dyes"); G. Oster and N. L. Yang, "Photopolymerization of Vinyl Monomers," Chem. Revs. 68, 125–151 (1968); J. F. Rabek, "Photosensitized Processes in Polymer Chemistry: A review," Photochem. Photobiol. 7, 5–57 (1968); G. Delzenne, "Sensitizers of Photopolymerization," Ind. Chim. Belge 24, 739–764 (1959); C. M. McCloskey and J. Bond, "Photosensitizers for Polyester-vinyl Polymerization," Ind. Eng. Chem. 47, 2125–2129 (1955).

If desired, polymerizable ethylenically unsaturated monomers having a functionality of two or greater may also be present in the coating composition. Typical examples of such monomers include allyl acrylate, allyl methacrylate, Bisphenol A dimethacrylate, diallyl phthalate, diallyl adipate, divinyl benzene, diethylene glycol diacrylate, diethylene glycol dimethacrylate, ethylene diacrylate, ethylene dimethacrylate, hexamethylene diacrylate, methallyl acrylate, pentaerythritol tetraacrylate, pentaerthyritol triacrylate, neopentyl glycol dimethacrylate, tetraethylene glycol dimethacrylate, diallyl allylphosphonate, triallyl cyanurate, triallyl phosphate, and trimethylolpropane trimethacrylate.

Application of the coating composition to the glass substrate may be accomplished by a variety of methods known in the coating art, including spraying, dipping, roller coating, flow-coating or silk-screening of liquid compositions containing solvents or dispersants in addition to the essential polymer and the organic photosensitizer compound. Also there may be used hot-melt coating, extrusion coating, powder coating, and the application of a pre-formed film or sleeve of the polymer photosensitizer composition.

Following application of the coating to the substrate, the coating is dried, if necessary, to remove any volatile materials such as solvents or dispersants, and simultaneously or subsequently crosslinked by the application of radiant energy, such as visible, or ultraviolet radiation; ionizing radiation; or radiofrequency or microwave radiation.

In addition to the essential polymer and photosensitizer and the optional polyfunctional monomer, the protective coating composition may contain one or more additional ingredients which may modify its appearance or properties, but do not detract from its essential tendency to retain glass fragments. Such additional ingredients may include colorants, plasticizers, surfactants, reinforcing agents, foaming agents, antioxidants, ultraviolet stabilizers, antistatic agents, lubricants, flame retardants, adhesion promoters, and processing aids. Incorporation of silane adhesion promoters is particularly advantageous in those applications requiring alkali resistance, i.e. coated returnable glass containers.

In one preferred embodiment of this invention, a solution containing the rubbery thermoplastic polymer and the organic photosensitizer compound in a suitable volatile solvent is applied to the surface of a glass container. The coating is dried and then crosslinked by a source of radiation, preferably in the ultraviolet range.

In a further preferred embodiment of the present invention, an organic photosensitizer compound is incorporated into an aqueous emulsion ("latex") of a rubbery thermoplastic polymer. The resulting emulsion is applied to the surface of a glass substrate, dried at an ambient or elevated temperature, and then crosslinked by irradiating in the ultraviolet range.

In a further specific embodiment of the present invention, a blowing agent such as an azo compound is incorporated into a liquid coating composition which also contains a rubbery thermoplastic polymer, an organic photosensitizer compound, and a suitable solvent or dispersant. The resulting composition is applied to a glass surface, dried, heated, and irradiated with ultraviolet light to produce a glass substrate bearing a cellular crosslinked protective coating.

The coatings of the present invention may be used in laminar combinations with other coatings, such as thin, lubricious coatings or oxidized polyethylene; primers, particularly those containing silane coupling agents, which increase adhesion to glass even in the presence of water and alkali; and abrasion-resistant exterior coatings.

The crosslinked polymeric coatings of this invention are typically of sufficient thickness (0.002 inch or greater) to resist shattering of a pressurized container, e.g. one filled with a carbonated soft drink or beer. However, thinner protective coatings of the same type may be used, particularly for applications in which the container does not contain internal pressure.

In a basic two-component system, it is contemplated that the crosslinkable polymeric compositions of this invention will contain about 90 to 99.99% by weight of the rubbery thermoplastic organic polymer and about 0.01 to 10% by weight of the organic photosensitizer material.

Preferably the polymeric coating composition is made photoreactive by uniformly dispersing or incorporating therein about 0.1 to 5% by weight of the photosensitizer. It is particularly preferred to use about 0.1 to 2% by weight photosensitizer.

In a basic three-component system, it is contemplated that the crosslinkable polymeric compositions of the present invention will ordinarily contain about 70 to 99.99% by weight of the rubbery thermoplastic organic polymer, about 0.01 to 10% by weight of the organic photosensitizer material, and about 0 to 30% of the optional polyfunctional monomer.

The proportions of such additional ingredients as may be present in the two or three component system are not considered in calculating these percentages.

The following example represents one of the best embodiments contemplated by the inventors in the practice of this invention.

EXAMPLE

A solution containing 0.5 parts by weight of benzophenone and 24.5 parts by weight of Estane 5715 (thermoplastic polyurethane, B. F. Goodrich Company) in 75 parts methyl ethyl ketone is prepared. The resulting solution is applied to the external surface of 12 commercial glass beverage containers of 16-oz capacity by dip-coating; each bottle is pre-heated to 70° C, dip-coated twice, dried 15 minutes at 70° C, then baked one hour at 120° C. This procedure results in the application of a uniform coating of thickness 0.003 inch ±20%.

Three of the coated bottles are irradiated with high-intensity ultraviolet light (principal wavelength 253.7 millimicrons, intensity greater than 6000 microwatts per square centimeter) for a period of two minutes. Additional groups of three bottles are similarly irradiated for ten minute and sixty minute periods respectively. The final groups of three bottles is not irradiated.

The surface tack of each group of three bottles is evaluated by laying two bottles side-by-side on a horizontal surface and placing a third bottle atop the other two so as to form a pyramid. The force required to separate the bottles is then noted. A substantial force is required to separate the unirradiated bottles and those irradiated for two minute or ten minute periods. However, a significantly smaller force is required to separate the bottles irradiated for sixty minutes.

The coated bottles are also subjected to a test for simulated line abuse. Here again, the bottles irradiated for sixty minutes demonstrate superior performance, i.e., superior resistance to marring of the coating surface as a result of bottle-to-bottle abrasion.

The coated containers are filled with dilute sulfuric acid and carbonated to an internal pressure of approximately sixty pounds per square inch by addition of a pre-determined amount of solid sodium bicarbonate. The capped containers are then dropped from a height of four feet onto a horizontal steel plate. All coatings show a pronounced tendency to retain glass fragments; there is no measurable difference in fragment scatter between the unirradiated and irradiated bottles.

We claim:

1. A process for forming a protective film on the surface of a glass substrate which comprises;
    applying a polymeric crosslinkable coating composition to the glass substrate surface, the coating composition comprising 90 to 99.99% by weight of at least one rubbery thermoplastic organic polymer having an ultimate elongation of at least 100% and being solid at ambient temperature and 10 to 0.01% by weight of at least one organic photosensitizer,
    and applying radiant energy to the polymeric composition in situ on the substrate surface so as to crosslink the composition and form a protective polymeric film having a thickness sufficient to resist shattering of the glass substrate.

2. The process of claim 1 wherein the crosslinked protective film has a thickness of at least 0.002 inch.

3. the process of claim 1 wherein said photosensitizer is selected from the group consisting of aliphatic ketones, aromatic ketones, quinones, azo compounds, aromatic hydrocarbons, aromatic nitro compounds, organic sulfur compounds, organic halogen compounds and aryl amines.

4. The process of claim 1 wherein 5 to 0.1 percent by weight of organic photosensitizer is present in said polymeric crosslinkable coating composition.

5. The process of claim 4 wherein 2 to 0.1 percent by weight of organic photosensitizer is present in said polymeric crosslinkable coating composition.

6. A process for forming a protective film on the surface of a glass substrate which comprises;

applying a polymeric crosslinkable coating composition to the glass substrate surface, the coating composition comprising 70 to 99.99% by weight of at least one rubbery thermoplastic organic polymer having an ultimate elongation of at least 100% and being solid at ambient temperature, 10 to 0.01% by weight of at least one organic photosensitizer and 30 to 0% by weight of a polymerizable ethylenically unsaturated monomer having a functionality of at least 2, and supplying radiant energy to the polymeric composition in situ on the substrate surface so as to crosslink the composition and form a protective polymeric film having a thickness sufficient to resist shattering of the glass substrate.

7. The process of claim 6 wherein the thickness of the polymeric film is at least 0.002 inch.

8. The process of claim 6 wherein 5 to 0.1 percent by weight of organic photosensitizer is present in said polymeric crosslinkable coating composition.

9. The process of claim 8 wherein 2 to 0.1 percent by weight of organic photosensitizer is present in said polymeric crosslinkable coating composition.

10. The process of claim 6 wherein said photosensitizer is selected from the group consisting of aliphatic ketones, aromatic ketones, quinones, azo compounds, aromatic hydrocarbons, aromatic nitro compounds, organic sulfur compounds, organic halogen compounds and aryl amines.

* * * * *